US012110959B2

(12) United States Patent
Keck et al.

(10) Patent No.: US 12,110,959 B2
(45) Date of Patent: Oct. 8, 2024

(54) PLANET CARRIER ASSEMBLY

(71) Applicant: Schaeffler Technologies AG & Co. KG, Herzogenaurach (DE)

(72) Inventors: Michael Keck, Emskirchen (DE); Jan Heymel, Erlangen (DE); Ralph Schimpf, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/035,763

(22) PCT Filed: Oct. 28, 2021

(86) PCT No.: PCT/DE2021/100862
§ 371 (c)(1),
(2) Date: May 8, 2023

(87) PCT Pub. No.: WO2022/117140
PCT Pub. Date: Jun. 9, 2022

(65) Prior Publication Data
US 2024/0011551 A1    Jan. 11, 2024

(30) Foreign Application Priority Data
Dec. 2, 2020   (DE) ............... 10 2020 131 940.1

(51) Int. Cl.
*F16H 57/00*  (2012.01)
*F16H 57/08*  (2006.01)
*F16H 57/02*  (2012.01)

(52) U.S. Cl.
CPC ....... *F16H 57/0025* (2013.01); *F16H 57/082* (2013.01); *F16H 57/0018* (2013.01); *F16H 57/02* (2013.01); *F16H 57/08* (2013.01)

(58) Field of Classification Search
CPC .... F16H 57/082; F16H 57/0025; F16H 57/08; F16H 57/02; F16H 57/0018
See application file for complete search history.

(56) References Cited

FOREIGN PATENT DOCUMENTS

| CN | 107438730 A | * | 12/2017 | ............ F16H 48/11 |
|---|---|---|---|---|
| DE | 10361701 A1 | | 8/2005 | |
| DE | 102012223226 A1 | | 6/2014 | |
| DE | 102012223228 A1 | | 6/2014 | |
| DE | 102014208003 A1 | | 10/2015 | |
| DE | 102015219455 A1 | * | 4/2017 | ............ F16H 57/08 |
| DE | 112012000461 B4 | | 6/2018 | |
| DE | 102018112249 A1 | * | 11/2018 | ............ F16H 57/08 |
| JP | S563352 A | | 1/1981 | |
| JP | H0625643 U | | 4/1994 | |

* cited by examiner

*Primary Examiner* — Tinh Dang

(57) ABSTRACT

A planet carrier assembly includes a shaft and a planet carrier with a first carrier side plate. The shaft includes an axially aligned axis of rotation, a guide surface, and an axial stop axially adjacent to the guide surface. The first carrier side plate is materially bonded to the shaft at a first joining zone formed axially between the axial stop and the first carrier side plate. The first carrier side plate has a holder radially supported on the guide surface and centered on the axis of rotation. The guide surface may run in a circumferential direction around the axis of rotation. The guide surface may have at least a section of an external cylindrical surface.

16 Claims, 6 Drawing Sheets

PLANET CARRIER ASSEMBLY

CROSS-REFERENCE TO RELATED APPLICATIONS

This application is the United States National Phase of PCT Appln. No. PCT/DE2021/100862 filed Oct. 28, 2021, which claims priority to German Application No. DE102020131940.1 filed Dec. 2, 2020, the entire disclosures of which are incorporated by reference herein.

TECHNICAL FIELD

The present disclosure relates to a planet carrier assembly including at least one carrier side plate of a planet carrier and including at least one shaft. The shaft is provided with at least one guide surface and with at least one axial stop axially adjoining the guide surface, and a holder for the carrier side plate is radially supported on the guide surface and is centered on an axially aligned axis of rotation of the shaft. The carrier side plate and the shaft are at least materially bonded to one another at least in one joining zone.

BACKGROUND

A planet gearbox having a planet carrier assembly of the type is disclosed in DE 11 2012 000 461 B4. The planet gearbox is formed by planet gears, planet pins, and the planet carrier assembly. The planet carrier assembly is made up of various components. One component is a planet carrier made up of two carrier side plates and the other component is a shaft with a radial flange. The planet carrier has two carrier side plates made of sheet metal, which are connected to one another axially by webs and planet pins. The planet carrier and the shaft are undetachably materially bonded to one another.

According to the embodiment shown in FIG. 1 of DE 11 2012 000 461 B4, one of the carrier side plates has a through-hole with an inner cylindrical guide surface. The inside diameter of the guide surface corresponds in nominal size to the outside diameter of an external cylindrical guide surface on the flange. Each of the guide surfaces is axially adjoined by a chamfer on one side. The carrier side plate is placed and supported on the flange in such a way that the inner-cylindrical guide surface and the outer-cylindrical guide surface lie concentrically and radially on one another and the planet carrier is thus guided concentrically to the shaft or to the radial flange.

An annular shoulder of the carrier side plate, the inner diameter of which is smaller than the outer diameter of the outer cylindrical guide surface on the flange, adjoins the through-hole axially. This annular shoulder forms an axial stop. The axial stop ensures that the two joining surfaces are aligned axially with one another and are radially opposite one another concentrically and are not axially offset from one another. The carrier side plate is supported axially on the carrier side plate via the stop. Due to the opposing conical joining surfaces or chamfers, an axially aligned arrow-shaped annular groove is formed at this point, at which consequently the planet carrier and the shaft are undetachably materially bonded to one another with an axially aligned V-seam.

SUMMARY

Provision is made for the carrier side plate and the shaft to be materially bonded to one another at the joining zone formed axially between the axial stop and the carrier side plate. The joining zone is thus formed in at least one radial plane which is penetrated perpendicularly by the axis of rotation of the shaft and runs axially through the weld seam or in the joining zone. The weld seam thus runs radially in depth. The joining zone is formed, for example, before the material connection by a joint, which is formed between the components resting axially on abutment against one another. In welding technology, such a weld seam produced thereon is also referred to as a butt weld. At the joint, the components face each other with or without play or rest against one another.

The present disclosure provides that a welding head of the welding device can be fed onto the joining zone directly perpendicularly to the axis of rotation, i.e., from a radial direction, unhindered by other components. According to one embodiment, a further weld seam must be made between the two carrier side plates of the planet carrier of the planet carrier assembly, in which case the welding head must also be fed in from the radial direction, i.e., the joining zone also in at least a radial plane that is pierced perpendicularly by the axis of rotation of the shaft and runs axially through the weld seam or in the joining zone. The latter is necessary, for example, if the carrier side plates are designed as identical parts. In this case, the welding process is optimized because it is not necessary to swivel the welding head when changing between the weld seams. Otherwise, when changing between the welding points, if the two joining zones are to be welded in succession, the welding head would need to be pivoted from an axial feed direction into a radial feed direction or in the reverse order. As a result, the welding device must have a more complex design, since the welding head must be pivotable and the cycle times required overall for the welds are longer due to the pivoting.

In the arrangement already described above with DE 11 2012 000 461 B4, the weld seams run axially in depth. The welding head must therefore be fed in from the axial direction. When designing such a planet carrier assembly, care must be taken to ensure that there is a sufficient radial distance between the joining zone and the shaft, taking into account the dimensions and radial freedom of movement of the welding head, so that the welding head can be fed axially without hindrance. The present disclosure provides that the distance between the joining zone can be implemented directly on the shaft or at a radial distance from the shaft, independently of the dimensions of the welding head.

In the example embodiment mentioned above, the first carrier side plate is connected to a second carrier side plate at a second joining zone by at least one second weld seam. The second joining zone is formed axially between the carrier side plates and the welding head is also fed in from the radial direction—and as a result the weld seam extends radially in the direction of the axis of rotation into the depth of the material.

In this context, an example embodiment also provides that the two carrier side plates are designed as identical parts and the forming tool or forming tools required for forming the two carrier side plates are of the same design for both carrier side plates. Tooling costs are saved, since the tooling required to produce both carrier side plates is reduced to one piece of equipment. In addition, due to the doubled number of pieces compared to individual production, each carrier side plate can be produced more cost-effectively.

It may be necessary, in a final step, to design the central holes in the carrier side plates differently. It may be necessary for the hole in the holder for the connection between the shaft and the carrier side plate to be designed differently than the hole in the other carrier side plate that is axially opposite this holder. This can be necessary, for example, when a large sun gear must be inserted into the planet carrier through the second carrier side plate. Alternatively, the hole in the second carrier side plate is also larger so that there is sufficient space for the components and for the assembly or feed tools for the assembly of the components in the planet carrier assembly.

It is conceivable that the carrier side plates, especially at the contact points for the planet gears, are provided with a sliding coating—for example with a manganese phosphate coating.

An example embodiment provides that the guide surface on which the first carrier side plate is guided runs around the axis of rotation in the circumferential direction in an interrupted or uninterrupted manner. The function of the guide surface is to radially support and center the carrier side plate attached to the shaft relative to the axis of rotation of the shaft. The carrier side plate forms a planet carrier together with an opposite carrier side plate. Alternatively, the planet carrier can also be formed from only one carrier side plate. Alternatively, the planet carrier can also be formed from other components in addition to the carrier side plate.

A carrier side plate is a component that carries the planet pins of the planet gearbox and the planet gears seated on the planet pin. Precise centering of the carrier side plate to the axis of rotation of the shaft is necessary, for example, so that the center distances of the planet pins and thus that of the planet gears to the axis of rotation are correct—which is necessary for proper meshing with the other gears of the planet gearbox. A shaft is to be understood as meaning any rotationally symmetrical component which is designed as a shaft or a stub shaft to be hollow or of solid material, and is able to rotate or be rotated about an axis of rotation.

A further embodiment provides that the guide surface has an external cylindrical surface at least in sections. Such cylindrical surfaces can be produced easily and inexpensively, for example by machining a cylindrical section on the shaft or on a hub connected to the shaft. Alternatively, it is also conceivable that a plurality of partial guide surfaces, for example on at least three spoke-like projections, or projections protruding just radially from the shaft, and are spaced apart from one another on the circumferential side with the same pitch or deviating distances.

A further embodiment provides that the axial stop is provided with at least one joining surface. The joining surface faces the carrier side plate and extends radially outwards away from the axis of rotation and in the circumferential direction at least in sections or completely around the axis of rotation. The first joining zone is formed axially between the carrier side plate and the joining surface. The axial stop is formed on the shaft and here, for example, on a hub of the shaft, and can be technologically integrated simply and inexpensively into the machining sequence for producing the external cylindrical guide surface. As a result, the manufacture of the carrier side plates can be simplified. The holder, which rests on the guide surface, can be produced inexpensively by punching. In the previously known prior art, a step was introduced inside the holder, for example by means of a machining process, to form the known axial stop.

Further configurations provide that the shaft and the first carrier side plate are materially bonded to one another by means of a weld seam formed in the first joining zone. The weld seam is designed, for example, as a V-seam running at least partially around the axis of rotation.

At a weld seam, the materials of the components are materially bonded to one another with or without the aid of additional materials—for example in the joining zone at a weld joint where the carrier side plate and the shaft are in axial contact with one another. Depending on their appearance in the axial longitudinal section along the axis of rotation and across the joining zone, weld seams are defined and executed as butt welds and fillet welds or V-seams.

In the case of butt welds, the two components butt together axially in the joining zone. In addition, a distinction is made between penetration-welded and non-penetration-welded weld seams. The seams are penetrated if the weld seam extends in depth over the entire abutment. In the case of non-penetrating seams, a zone free of material bonding remains in the depth of the joint or abutment. In the cases considered in connection with the invention, the weld seams extend radially either over the entire abutment (joining zone) in depth or a radially extending zone free of material bonding remains in the joining zone where the components rest.

With a V-seam, the surfaces for the material connection are inclined towards each other in a V-shape. Such surfaces are introduced, for example, by machining or by bending, embossing, stamping, or the like, on formed parts. A V-seam is usually a butt weld.

An example embodiment provides that the first carrier side plate is connected to a second carrier side plate at a second joining zone by at least one second weld seam. In this case, the first carrier side plate is connected to a second carrier side plate at a second joining zone formed axially between the carrier side plates by at least one second weld seam or spot welds. The second joining zone and the second weld seam each extend at least partially in the radial direction and are therefore formed axially in at least one radial plane between the carrier side plates.

A further embodiment provides that the guide surface and the axial stop are formed on a hub which is directed radially away from the axis of rotation and emanates from the shaft. The hub is therefore a component protruding radially from the shaft or a spoke-like or disc-shaped section, flange or similar that protrudes radially from the shaft and is made as one part and from one material with the hub. The shaft may be formed to be rotationally symmetrical and have the outer circumference as the guide surface and the axial stop. With such an embodiment of the shaft, the carrier side plate can be variably adapted to different applications and attached to the shaft or hub. In this case, for example, enough space and freedom of movement for fastening the carrier side plate to the hub can only be created by changing the radial dimensions of the hub and the holder. Alternatively, the center distances of the planet pins to the axis of rotation or to a sun gear or to the toothing of the sun gear can also be set via the dimensions of the hub. The shaft blank has corresponding allowances on the hub, which can then be removed to suit the various requirements.

Different requirements are often placed on the components or materials of the carrier side plate and shaft. For example, the shaft must be hardened and formed of a material that lends itself well to machining. The carrier side plate of the planet carrier, on the other hand, need not be hardened in every case, and can be formed from a steel that may be suitable for cold forming. The hub, as provided by an example embodiment, may be made as one part and from the same material as the shaft together with the shaft. For example, a non-hardened zone that can be welded more easily can be created or provided on the hub that protrudes radially from the shaft.

A planet gearbox having the planet carrier assembly is provided with planet pins which are each supported on the left and right in a carrier side plate and on which planet gears are seated. In addition, the planet gearbox optionally has at least one sun gear or at least one ring gear or both. The carrier side plates form what are termed the planet webs. Optionally, the support panels can be equipped with additional functional elements, such as lubricant guide structures or oil drip pans.

A further embodiment provides at least one oil drip pan. The oil drip pan is attached to one of the carrier side plates, e.g., to the first carrier side plate. The carrier side plate is provided with connecting holes and the planet pins have oil bores. The oil drip pan has at least one support plate and a channel connected to the support plate and running around an axially aligned axis of rotation of the transmission device. The oil drip pan is also provided with oil guiding nozzles and connecting elements. An oil guiding nozzle is inserted axially into one of the oil bores. The oil drip pan is held on the carrier side plate by means of the connecting elements which in each case at least partially engage firmly in one of the connecting holes.

A platform follows each of the connecting elements in the axial direction on a side facing away from the carrier side plate. On each of the platforms, at least one projection that rises axially over the platform and over the surface protrudes from a flat surface of the respective platform. In this configuration, the projection serves as an aid for positional orientation during assembly of the oil drip pan on the carrier side plate and is therefore provided for correct assembly positioning both of the oil guiding nozzles to the oil bores and of the connecting elements to the connecting holes. In addition, if the projections are designed appropriately, the oil drip pan can also be gripped or guided over the projections during assembly.

One embodiment provides that the respective surface from which the respective projection protrudes axially extends in an imaginary radial plane which is perpendicularly penetrated by the axis of rotation. The flat surfaces of all platforms can lie in a common imaginary radial plane or can be offset axially to one another in radial planes that are axially spaced apart from one another. In such a configuration, these surfaces aligned on one or more radial planes serve as reference surface(s) that are required during assembly for exact positioning of the oil drip pan relative to the carrier side plate or the planet gearbox.

In addition, it is optionally provided that in each case one of the connecting elements protrudes axially from the respective platform on a side facing the carrier side plate—that is to say it may be formed in one piece with the platform. In this design feature, the radial spacing of the connecting elements is not or is only partially dependent on the radial dimensions of the support plate or the channel due to a corresponding design of the platforms. If necessary, the platforms with the connecting elements can protrude radially beyond the outer contours of the oil drip pan. The platforms thus form a radial extension from which the connecting elements protrude. The distances between the attachment points (connecting elements) of the oil drip pan can be adjusted to the design of the carrier side plate, regardless of the position of the actual oil guide, via the dimensions of the platforms. In addition, the dimensions of the hub and the joining zone and the distances between the oil drip pan can be adjusted to one another or adapted to one another, taking the requirements into account.

In addition, it is optionally provided that the respective projection is designed as a rib connected to the respective platform and the channel. On the one hand, a rib can be easily engaged during assembly and, on the other hand, the rib forms a stiffening of the fastening structure. The latter is helpful, for example, if the connecting elements are pressed or snapped into the connecting holes with pressure during assembly of the oil drip pan onto the carrier side plate.

An example embodiment provides that a detachable or undetachable positive-fit snap connection between the planet carrier and the oil drip pan is implemented with the connecting holes and the connecting elements. The connecting elements are designed, for example, as snap hooks or have an expanding dowel-like design. Such configurations can be produced easily, e.g., when producing oil drip pans from plastics. In the connecting holes, either corresponding undercuts for hooking the snap hooks or expansion dowels are formed, or the hooks or expanding elements reach through the respective connecting hole axially and hook on the other side, gripping behind the wall or a wall section of the carrier side plate.

The respective oil guiding nozzle, either one, several or all of the oil introduction nozzles of the oil drip pan, engage(s) in one of the oil bores of the planet pins, which usually extend in the axial direction in the planet pins and are designed as through-holes or blind holes. A transverse bore leads from the respective oil bore to at least one planet bearing for at least one planet gear.

BRIEF DESCRIPTION OF THE DRAWINGS

In the following, the present disclosure is explained in more detail with reference to an exemplary embodiment. In the figures.

DETAILED DESCRIPTION

Figure 1:
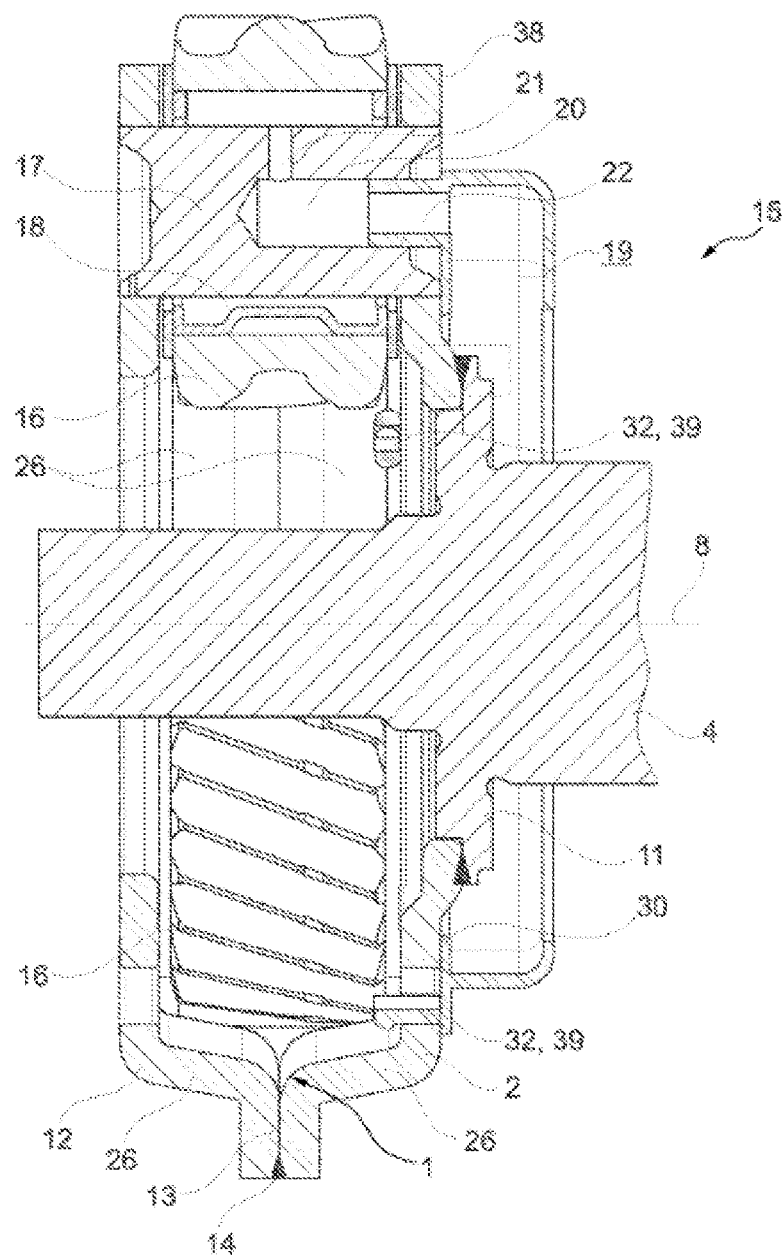
FIG. 1 shows a planet gearbox 15 in a longitudinal section along an axis of rotation 8, with the axis of rotation 8 considered to be axially aligned regardless of its actual orientation in space and radial means transverse to the axis of rotation 8.

The following description is made with reference to FIG. 1. The planet gearbox 15 includes the planet carrier assembly 1, planet gears 16, planet pins 17, planet bearings 18 and of an oil drip pan 19. Each of the planet gears 16 is rotatably mounted on a planet pin 17 with a planet bearing 18. Each planet pin 17 is supported in a first carrier side plate 2 on the right and in a second carrier side plate 12 on the left. The planet pins 17 are each provided with a blind hole 20 from which a transverse bore 21 leads to the respective planet bearing 18. The oil drip pan 19 is placed laterally on the first carrier side plate 2 and engages in each case with an oil guiding nozzle 22 axially in one of the blind holes 20 in each case.

Figure 5:
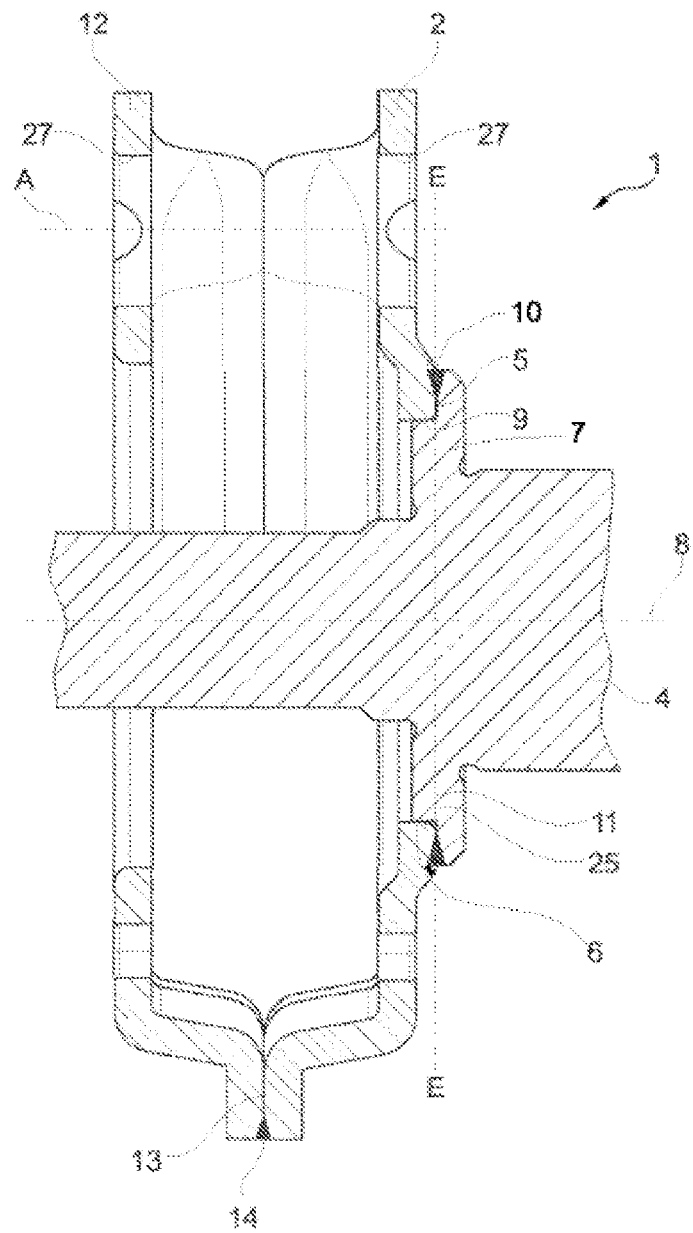
FIG. 5 shows the planet carrier assembly 1 in a longitudinal section along the axis of rotation 8.

The following description is made with reference to FIGS. 1 and 5. The planet carrier assembly 1 is formed from the first carrier side plate 2, the second carrier side plate 12, and the shaft 4. The first carrier side plate 2 is materially bonded (e.g., welded) to a hub 11, and the first carrier side plate 2 and the second carrier side plate 12 are materially bonded to one another.

Figure 2:
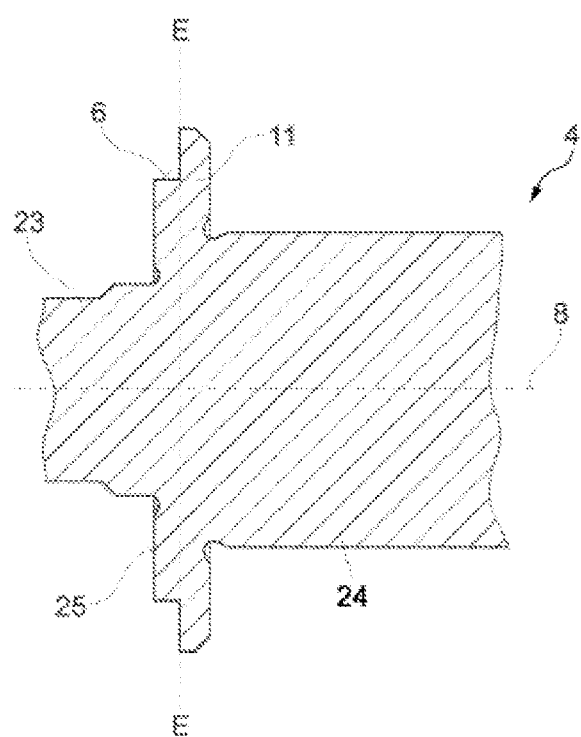
FIG. 2 shows a shaft 4 of a planet carrier assembly 1 installed in the planet gearbox indicated in FIG. 1 and shown in FIG. 5, partially as an individual part, in a longitudinal section along the axis of rotation 8.

The following description is made with reference to FIG. 2. The shaft 4, shown only as a cutout in FIG. 2, is formed from steel as one part and from one material, from two shaft sections 23, 24 and from the hub 11. The hub 11 lies axially between the first shaft section 23 and the second shaft section 24 and runs around the axis of rotation 8. The hub 11 protrudes radially beyond the two shaft sections 23 and 24. The shaft section 23 on the left in the picture has a diameter that is smaller in two stages compared to the diameter of the shaft section 24 on the right in the picture. The hub 11 has an external cylindrical guide surface 6 on the outside peripheral side and an axial stop 7 (ref. FIG. 5). The axial stop 7 is axially directly adjacent to the guide surface 6 and protrudes radially beyond the outer cylindrical guide surface 6. A joining surface 25 formed on the axial stop 7 follows directly on the guide surface 6. The joining surface 25 is an annular surface lying in an imaginary radial plane E—E perpendicularly penetrated by the axis of rotation 8. Alternatively, instead of the annular surface, individual axial stop surfaces or points on the axial stop can be formed in the same radial plane or in imaginary radial planes that are axially offset from one another.

Figure 3:
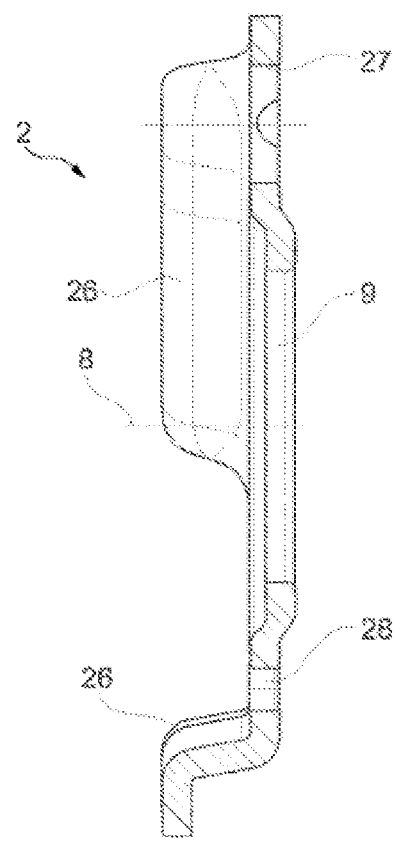
FIG. 3 shows a first carrier side plate 2 from the planet carrier assembly 1 shown in FIG. 5 as an individual part.

The following description is made with reference to FIG. 3. The first carrier side plate 2 is a component made of sheet metal, which was produced by cold forming, for example by drawing and/or embossing and stamping. The carrier side plate 2 has first webs 26 distributed uniformly relative to one another on the circumference around the axis of symmetry. The axis of symmetry lies in the mounted planet carrier assembly 1 on the axis of rotation 8 of the shaft. Due to the sectional view according to FIG. 3, only two of the webs 26 are visible, one in section and one viewed radially from the inside. The carrier side plate 2 is provided with an axial through-hole, which is the holder 9. The holder 9 is provided for a guided seating on the guide surface 6 (see FIG. 5). Pin supports 27 corresponding to the number of planet pins installed in a planet gearbox 15 (cf. FIG. 1) are provided in the carrier side plate 2. The pin supports 27 are axial through-holes. Because of the sectional view, only one of the pin supports 27 is visible in FIG. 3. The carrier side plate 2 is also provided with further through-holes 28, which are introduced, for example, for technological reasons and/or which are used to attach an oil drip pan (see FIGS. 5 and 6). In this exemplary embodiment, three pin supports 27 and three through-holes 28 are provided, however, only one is visible due to the sectional view.

Figure 4:
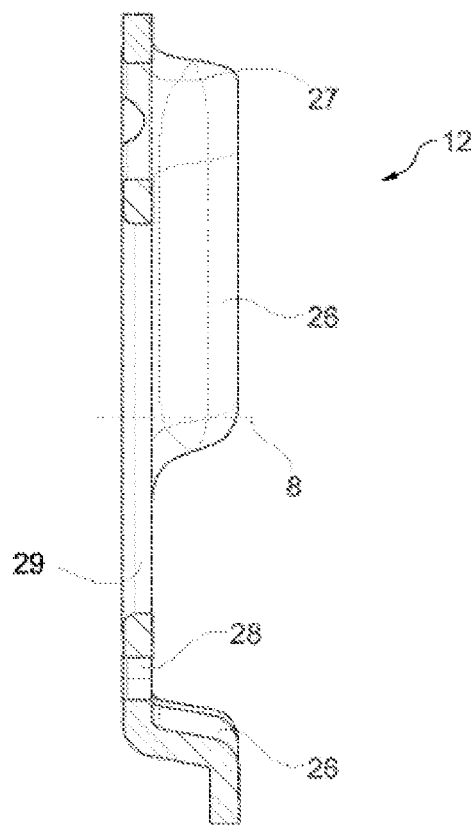
FIG. 4 shows a second carrier side plate 12 from the planet carrier assembly 1 shown in FIG. 5 as an individual part.

The following description is made with reference to FIG. 4. The shape of the carrier side plate 12 essentially corresponds to the carrier side plate 2 shown in FIG. 3. It also has the three webs 26, the pin supports 27, and the through-holes 28. However, the central through-hole 29 of the carrier side plate 12 has a larger diameter than the holder 9 of the carrier side plate 2 (see FIG. 3). Due to the sectional view according to FIG. 4, only two of the webs 26 are visible, one in section and one viewed radially from the inside. In this exemplary embodiment, three pin supports 27 and three through-holes 28 are provided, however, only one is visible due to the sectional view.

The following description is made with reference to FIG. 5. The first carrier side plate 2 is supported radially on the guide surface 6 via the inner contour of the holder 9 and is centered on the axis of rotation 8 of the shaft 4. The first carrier side plate 2 and the shaft 4 are at least materially bonded to one another at a first joining zone 5. The first carrier side plate 2 and the shaft 4 are in axial contact with one another at the joining zone 5 so that they are materially bonded to one another at the first joining zone 5 formed axially between the axial stop 7 and the first carrier side plate 2 running around the axis of rotation 8. The first joining zone 5 is formed axially between the carrier side plate 2 and the joining surface 25 and lies in the radial plane E-E through which the axis of rotation 8 penetrates perpendicularly.

The shaft 4 and the first carrier side plate 2 are materially bonded to one another by means of a first weld seam 10 designed as a V-seam in the first joining zone 5. The V-seam extends in the radial direction perpendicular to the axis of rotation 8 into the radial depth and runs around the axis of rotation 8 on the peripheral side. The result is a seam that is not welded through, in which a zone free of material bonding remains radially between the tip of the V and the guide surface 6 in the depth of the joint or abutment, on which the carrier side plate 2 and the axial stop 7 rest axially against one another.

The first carrier side plate 2 and the second carrier side plate 12 rest against one another axially via the webs 26. The pin supports 27 are aligned coaxially on the axis A with each other. The first carrier side plate 2 is connected to the second carrier side plate 12 at a second joining zone 13 by at least one second weld seam 14. The second joining zone 13 and thus the second weld seam 14 are formed axially between the carrier side plates 2 and 12. In the case of this through-welded seam, the weld seam extends radially only partially over the abutment (the joining zone) in depth.

Figure 6:
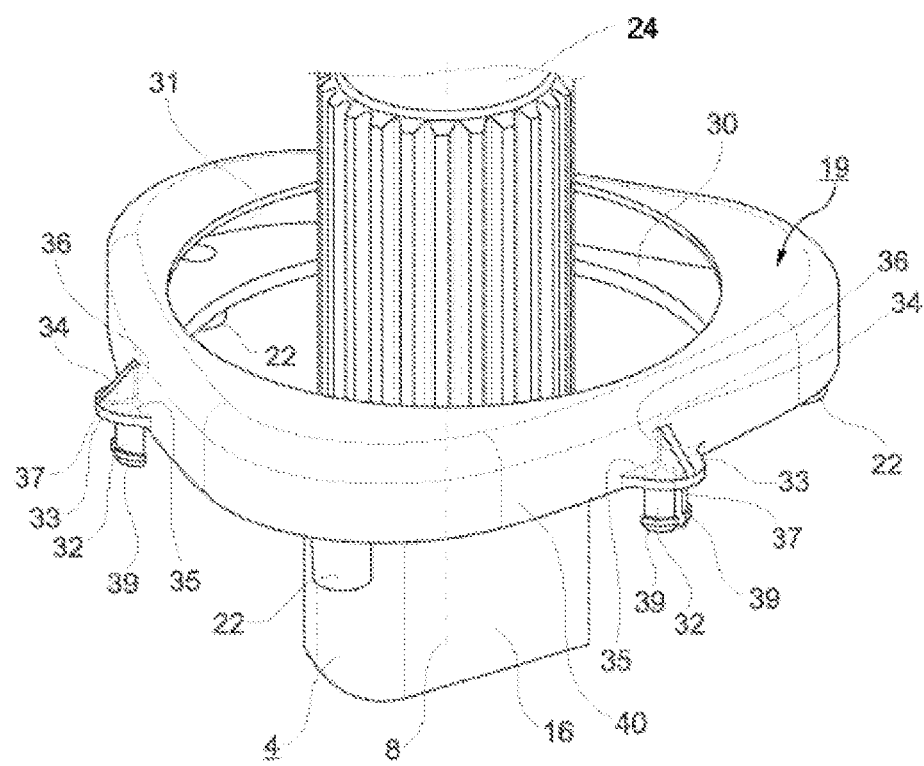
FIG. 6 shows an overall view of an oil drip pan 19 positioned opposite the second shaft section 24 of the shaft 4 of a planet carrier assembly 1 shown in FIG. 5.

The following description is made with reference to FIG. 6. FIG. 6 shows the oil drip pan 19 in a position in which the oil drip pan 19 is aligned ready for assembly with a shaft 4, for example the shaft 4 of the planet carrier assembly 1 shown in FIG. 5. The oil drip pan 19 includes a support plate 30, a channel 31, oil guiding nozzles 22, and connecting elements 32. With the channel 31, platforms 33 are formed as one part and from one material of plastic, and protrude radially beyond the outer contour 40 of the channel 31 in the radial direction, i.e., transversely to the axis of symmetry or rotation 8. A connecting element 32 protrudes axially on one side of the respective platform 33 and a projection 34 protrudes in the axial direction from a surface 35 of the platform 33 on the other side. The respective projection 34 is designed in the form of a gusset plate and merges into the surface 35 with its radial root 36 as one part and from one material into the channel 31 and with its axial root 37 as one part and from one material. The connecting elements 32 are plug connectors with a snap function and have snap-in lugs 39 for this purpose.

The following description is made with reference to FIG. 1. The support plate 30 of the oil drip pan 19 rests axially on an end face 38 of the first carrier side plate 2 and is inserted with the oil guiding nozzles 22 in the blind holes 20. The oil drip pan 19 is fastened to the supporting component 2 by means of the connecting elements 32 in such a way that the connecting elements 32 axially pass through the respective through-holes 28 formed in the wall of the carrier side plate 2 and with the snap-in lugs 39 reach behind axially or radially on a side of the carrier side plate 2 facing away from the oil drip pan 19. The first carrier side plate 2 and the second carrier side plate 12 rest against one another axially via the webs 26. The first carrier side plate 2 is connected to the second carrier side plate 12 at a second joining zone 13 by at least one second weld seam 14. The second joining zone 13 and thus the second weld seam 14 are formed axially between the carrier side plates 2 and 12.

REFERENCE NUMERALS

1 Planet carrier assembly
2 First carrier side plate
3 Planet carrier
4 Shaft
5 First joining zone (between carrier side plate and shaft)
6 Guide surface on the shaft
7 Axial stop on the shaft
8 Axis of rotation of the shaft
9 Holder of the carrier side plate
10 Weld seam
11 Hub
12 Second carrier side plate
13 Second joining zone
14 Second weld seam
15 Planet gearbox
16 Planet gear
17 Planet pins
18 Planet bearing
19 Oil drip pan
20 Blind hole
21 Cross bore
22 Oil guiding nozzle of the oil drip pan
23 First shaft section
24 Second shaft section
25 Joining surface
26 Web
27 Pin support
28 Through-hole
29 Through-hole
30 Support plate
31 Channel
32 Connecting element
33 Platform
34 Projection
35 Surface
36 Radial root
37 Axial root
38 End face
39 Snap-in lugs
40 Outer contour

The invention claimed is:

1. A planet carrier assembly comprising a first carrier side plate of a planet carrier and comprising a shaft, the shaft being provided with a guide surface and with an axial stop axially adjacent to the guide surface, and a holder for the first carrier side plate being radially supported on the guide surface and being centered on an axially aligned axis of rotation of the shaft, the first carrier side plate and the shaft being at least materially bonded to one another in a first joining zone, wherein the first carrier side plate and the shaft are materially bonded to one another at the first joining zone formed axially between the axial stop and the first carrier side plate, wherein the axial stop is provided with at least one joining surface which faces the first carrier side plate and extends radially outwards away from the axis of rotation and extends at least partially around the circumference of the joining surface, and the first joining zone is formed axially between the first carrier side plate and the joining surface.

2. The planet carrier assembly according to claim 1, wherein the guide surface runs in the circumferential direction around the axis of rotation.

3. The planet carrier assembly according to claim 1, wherein the guide surface has an external cylindrical surface at least in sections.

4. The planet carrier assembly according to claim 1, wherein the shaft and the first carrier side plate are materially bonded to one another by means of a first weld seam designed as a V-seam in the first joining zone.

5. The planet carrier assembly according to claim 1, wherein the guide surface and the axial stop are formed on a hub which is directed radially away from the axis of rotation and emanating from the shaft.

6. The planet carrier assembly according to claim 5, wherein the shaft and the hub are made as one part and from one material with one another.

7. The planet carrier assembly according to claim 1, wherein the first carrier side plate and the shaft are formed from steel materials which differ from one another.

8. The planet carrier assembly according to claim 1, wherein the first carrier side plate is connected to a second carrier side plate at a second joining zone by at least one second weld seam, wherein the second joining zone and the second weld seam are formed at least in part to be axial between the carrier side plates.

9. A planet carrier assembly comprising:
   a shaft comprising:
      an axially aligned axis of rotation;
      a guide surface; and
      an axial stop axially adjacent to the guide surface; and
   a planet carrier comprising a first carrier side plate materially bonded to the shaft at a first joining zone formed axially between the axial stop and the first carrier side plate, the first carrier side plate comprising a holder radially supported on the guide surface and centered on the axis of rotation, wherein:
   the axial stop comprises a joining surface that:
      faces the first carrier side plate;
      extends radially outwards away from the axis of rotation; and
      extends at least partially around the axis of rotation; and
   the first joining zone is formed axially between the first carrier side plate and the joining surface.

10. The planet carrier assembly of claim 9, wherein the guide surface runs in a circumferential direction around the axis of rotation.

11. The planet carrier of claim 9, wherein the guide surface comprises at least a section of an external cylindrical surface.

12. The planet carrier assembly of claim 9 wherein, the first carrier side plate is materially bonded to the shaft by a first weld seam designed as a V-seam.

13. The planet carrier assembly of claim 9 further comprising a hub, wherein the guide surface and the axial stop are formed on the hub.

14. The planet carrier assembly of claim 13, wherein the hub is a portion of the shaft made as one part and from one material with the shaft.

15. The planet carrier assembly of claim 9, wherein the first carrier side plate and the shaft are formed from different steel materials.

16. The planet carrier assembly of claim 9, wherein the planet carrier further comprises a second carrier side plate materially bonded to the first carrier side plate by a second weld seam at a second joining zone formed axially between the first carrier side plate and the second carrier side plate.

* * * * *